Figure 1:
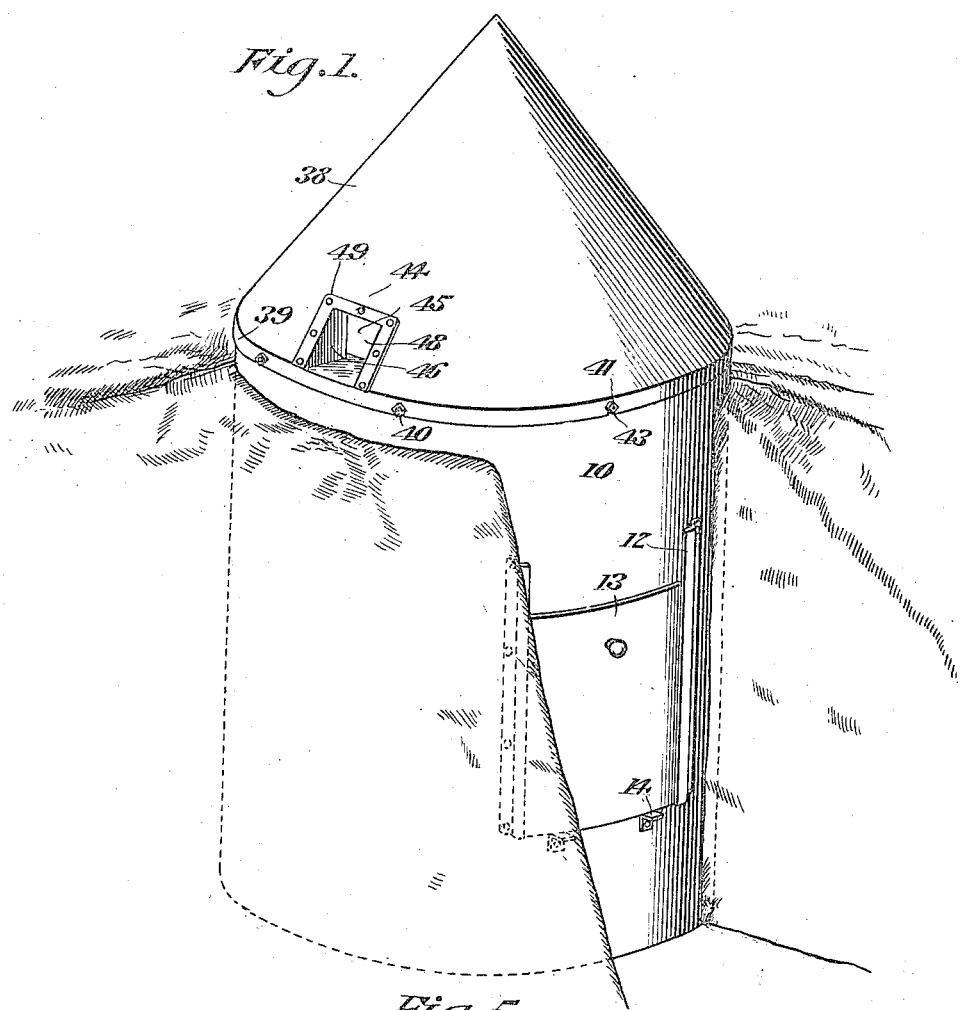

W. V. SHAW.
WATERING TROUGH.
APPLICATION FILED JUNE 15, 1917.

1,240,785.

Patented Sept. 18, 1917.
3 SHEETS—SHEET 1.

WITNESSES

INVENTOR
W. V. Shaw
BY Victor J. Evans
ATTORNEY

W. V. SHAW.
WATERING TROUGH.
APPLICATION FILED JUNE 15, 1917.
1,240,785.
Patented Sept. 18, 1917.
3 SHEETS—SHEET 2.
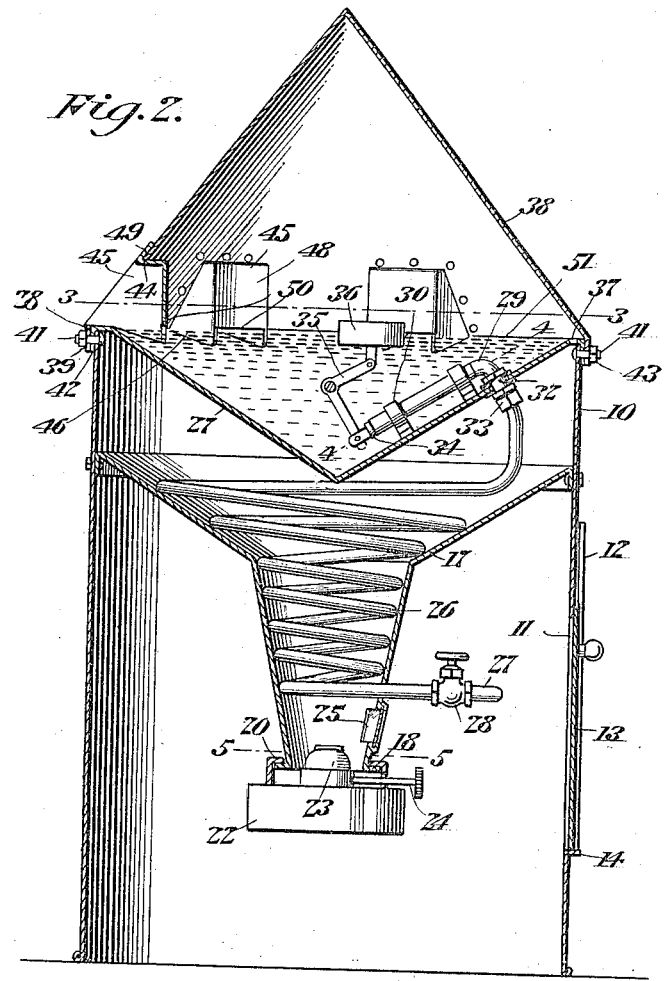
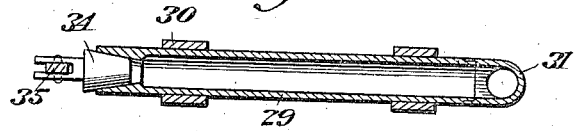
WITNESSES
INVENTOR
W. V. Shaw
BY Victor J. Evans
ATTORNEY W. V. SHAW.
WATERING TROUGH.
APPLICATION FILED JUNE 15, 1917.
1,240,785.
Patented Sept. 18, 1917.
3 SHEETS—SHEET 3.
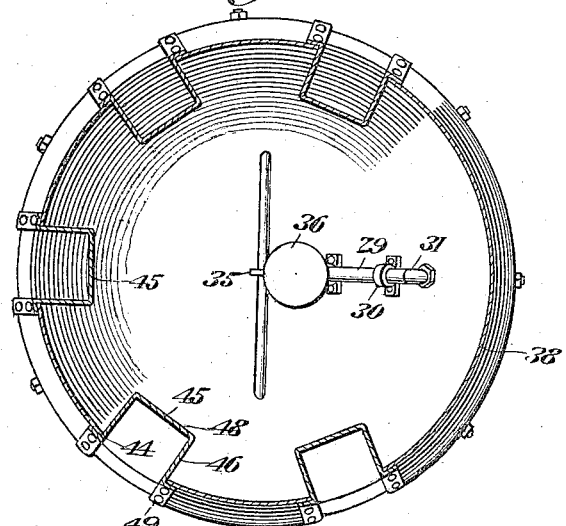
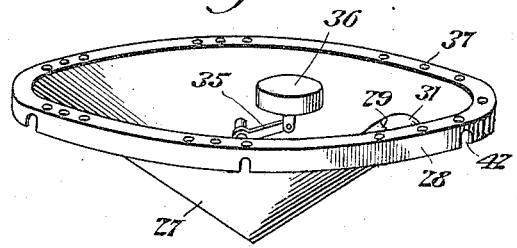
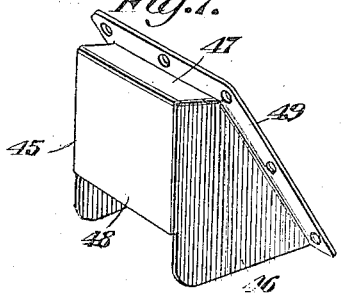
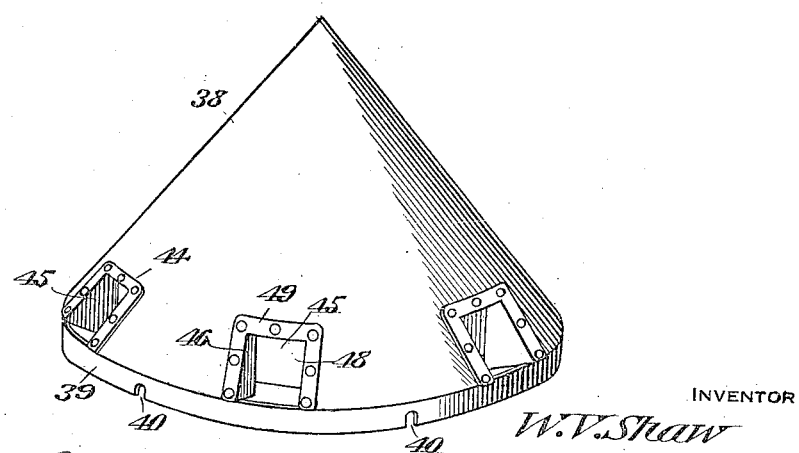
WITNESSES
INVENTOR
W. V. Shaw
BY Victor J. Evans
ATTORNEY

UNITED STATES PATENT OFFICE.

WILLIAM V. SHAW, OF RIVERSIDE, IOWA.

WATERING-TROUGH.

1,240,785.  Specification of Letters Patent.  Patented Sept. 18, 1917.

Application filed June 15, 1917.  Serial No. 175,015.

*To all whom it may concern:*

Be it known that I, WILLIAM V. SHAW, a citizen of the United States, residing at Riverside, in the county of Washington and State of Iowa, have invented new and useful Improvements in Watering-Troughs, of which the following is a specification.

This invention relates to improvements in automatic watering troughs.

An object of the invention is to produce an improved device of this character wherein water will be automatically fed to a suitable pan or receptacle and wherein the water in the said receptacle is protected from the free entrance of dirt or other foreign matter, but which at the same time provides free access for the snouts of hogs or other animals drinking from the device.

A further object of the invention is to produce a hog waterer in which water will be automatically delivered into a water pan or receptacle in a heated condition, the pan being protected by a dome-like top provided with drink openings directly above the level of the water, and means being provided between the water receptacle and the top whereby the heat units employed for heating the water when being delivered to the pan or receptacle may be caused to circulate through the top and out of said drink openings.

With the above and other objects in view the improvement resides in the construction, combination and arrangement of parts set forth in the following specification and falling within the scope of the appended claims.

Figure 5:
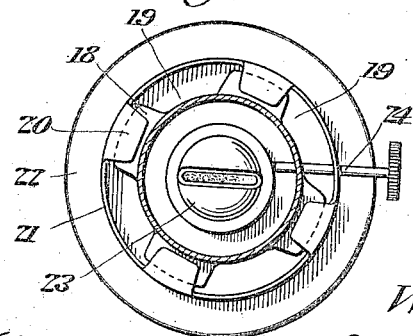

In the drawings:

Figure 1 is a perspective view of the improvement,

Fig. 2 is a substantially vertical longitudinal sectional view through the same, Fig. 3 is a horizontal sectional view approximately on the line 3—3 of Fig. 2, Fig. 4 is a sectional view approximately on the line 4—4 of Fig. 2, Fig. 5 is a horizontal sectional view approximately on the line 5—5 of Fig. 2, Fig. 6 is a perspective view of the dome-shaped top removed, Fig. 7 is a similar view of one of the hoods or vestibules designed to be arranged in the drink openings in the top, and Fig. 8 is a perspective view of the water receptacle or pan.

The improvement is preferably constructed of metal but the parts thereof are assembled by rivets, nuts or bolts so that no solder is employed in the construction.

As the device is primarily adapted as a watering trough for hogs a portion of the body or casing thereof may be partially buried in the ground and the drink openings may be so arranged if desired as to communicate with the several pens in which the hogs are retained.

The improvement contemplates the employment of an outer shell or casing 10 which is preferably in the nature of a tubular member, the same having one of its sides provided with an opening 11, and to the opposite sides of the said openings are arranged cleats 12 forming ways for a suitable door 13. The numerals 14 designate brackets secured to the casing between the cleats 12, at the lower ends of the said cleats, the door 13 contacting with the said brackets being limited in its downward movement to retain the same in proper closing position. When the device is partially buried in the ground, an excavation is arranged adjacent to the side of the casing provided with the door 13, so that free access can be obtained to the said door and to the interior of the casing.

Secured in the casing 10, as at 15, is a flange formed upon the upper edge of the flared portion 16 of a substantially frusto-conical jacket member 17. This jacket has its lower end reduced and formed with an outturned flange 18, the said flange being notched at intervals, as indicated by the numerals 19 so as to provide a passage for the offset members or fingers 20 formed upon a ring member 21 secured to an oil reservoir 22, the said reservoir being provided with the usual burner 23 within which is arranged the usual wick, and the numeral 24 designates the arm or shaft connected with the spur wheel which regulates the wick. When the fingers are passed through the notches 19 in the flange 19, the oil reservoir is revolved so that the said flanges will be disposed away from the said notches and whereby the lamp is removably connected with the jacket 17. The jacket 17, at the side thereof opposite the opening 11 in the casing 10 is provided with an aperture or opening which is closed by a transparent plate 25, such as a sheet of isinglass, and whereby the operator may determine the height of the wick and consequently the size of the flame of the lamp.

Received in the jacket 17 are the coils 26 of a pipe member 27 which is provided with a valve 28 and which leads to a suitable source of water supply. The coils are extended beyond the reduced or frusto-conical portion of the jacket 17 and arranged over the outwardly flared portion 16 of the said jacket, as clearly illustrated by the drawings.

The water pan is indicated by the numeral 27 and comprises a dished member preferably in the nature of a hollow cone-shaped element that has its outer edge resting upon the upper edge of the casing 10 and provided with a continuous downturned flange 28 that surrounds the said upper edge of the casing 10. Within the water pan 27 is arranged a pipe member 29 disposed in a line with one of the inclined sides of the said pan and supported preferably by brackets 30 that are secured to the pan. One of the ends of the pipe 29 has secured thereto an elbow 31 to which is attached a short pipe 32 threaded to receive a coupler member 33 that is secured to the threaded outer end of the coil 26, suitable means being arranged around the short pipe 32 to the opposite sides of the opening in the pan through which the said short pipe passes, to provide a water tight joint. The end of the pipe 39 opposite that provided with the elbow 31 has its bore inwardly flared forming the same with a valve seat which is engaged by a needle valve 34 that is operated by an angular centrally pivoted lever 35 connected with a float 36. The valve is so regulated with respect to the angular connection with the float 36 as to permit of water flowing through the coil 26 to determine level in the pan 27, the said level, as indicated by the drawings, being nearer the top of the said pan. The pan is provided with one or more vents 37, whereby the heat units traveling through the jacket 17 and contacting with the outer convex face of the pan 27 may find an outlet.

The top of the device is indicated by the numeral 38, and comprises a dome or hollow frusto-conical member, the outer edge of which being flanged, as at 39, and the said flange is provided with notches 40. The flange 39 is adapted to surround the flange 38 of the pan 27, and the numerals 41 designate threaded securing elements passing through openings in the upper portion of the casing 10, openings or notches 42 in the flange 28 of the pan 27 and through the referred to notches 40 in the flange 39 of the dome-shaped top 38, while the numerals 43 designate nuts which engage with the bolt members 42 and whereby the top 38 and the pan are removably connected with the casing 10.

The top 38 is provided, at suitable intervals with spaced drink openings 44, the same being preferably of a rectangular formation and the lower walls of the same terminate in a line with the juncture of the angular walls of the top with the flange 39 thereof. These openings are adapted to receive hood or vestibule members which are broadly indicated by the numerals 45 and which include each sides 46, a top 47, a rear portion or back 48, and an outer flanged portion 49 connected with the edges of the sides of the top. The flange 49 may be secured in any desired manner if desired, to the top 38. By reference to the drawings it will be noted that the lower edges of the sides 36 are disposed at a downward angle from the flange 49 so that the same are arranged a suitable distance below the lower wall of the back 48, and consequently the sides of the vestibule members 45 are arranged below the level of the water in the pan 37 while the lower edge of the backs 48 is disposed a slight but suitable distance above the level of said water. This arrangement permits of restricted passages which for distinction are indicated by the characters 50 in Fig. 2 of the drawings, between the rear portions of the vestibules and the level of the water, indicated by the character 51 in the said Fig. 2 of the drawings so that the heat units from the lamp passing through the vent 37 will have restricted outlets through the said passages 50.

By a construction and arrangement as above described it will be noted that the water delivered through the coil 26 into the pan 27 is first heated by the flame of the lamp contacting with the lower portion of the coil and the heat units from the said lamp being directed through the substantially frusto-conical lower portion of the jacket 17. The heat units also contact with the lower wall of the pan 27, and passing through the vent 37 and directed by the flared or angular walls of the top member 38 to the upper surface of the water, so that the water in the pan is thus heated by the same source in three distinct and separate manners and as a consequence it will be apparent that a comparatively small flame only from the lamp will be required to retain the water in the pan at the proper temperature regardless of the intensity of cold. It will be further noted that the vestibules 45 prevent the animal slopping in the water in the pan as the side movement of his snout is restricted by the side walls of the vestibule and the inward movement of his snout is restricted by the end wall 48 of the said vestibule while the cone-shaped top member 38 provides a shed for snow, sleet, etc., and also serves as a means for directing the heat units let therein through the vent 37 first in the direction of the water pan and then through the restricted outlets 50.

It is, of course, to be understood that the lamp is employed only in the winter time or during cold period of the year, while the water passing through the coil into the pan during warm periods is delivered thereto in a non-heated condition.

Having thus described the invention, what I claim is:

1. In a hog watering device, a casing, a conical pan having a flanged edge engaging the top of the casing, a dome-shaped top having a depending flange surrounding the flange of the pan, both of said flanges being notched, elements secured to the casing and contacting with the flange of the dome for securing the dome and pan on the casing, said top having drink openings, a vestibule in each of said openings, means for delivering water to the pan, and means for regulating the delivery of the water to the pan.

2. In a stock watering device, a casing having an opening and a slidable door closing the opening, a jacket in the casing including a lower frusto-conical member having an upper flared portion which is secured to the casing, the frusto-conical portion having its lower edge provided with a notched flange, a lamp member having offset fingers designed to be passed through the notches in the flange and to rest on the flange, said jacket having an opening, a transparent plate closing the opening, a valved tube connected with the source of water supply and provided with a coil received in the frusto-conical and flared portions of the jacket, a substantially cone-shaped pan removably connected with the top of the casing and communicating with the coil, a valve for regulating the entrance of water through the coil into the pan, float means associated with said valve, a frusto-conical top surrounding the pan, said top having drink openings, a vestibule in each of said openings including spaced sides, a connecting top and a rear wall, and the pan having a vent opening communicating with the top.

In testimony whereof I affix my signature.

WILLIAM V. SHAW.

Copies of this patent may be obtained for five cents each, by addressing the "Commissioner of Patents, Washington, D. C."